United States Patent [19]

Boileau

[11] 4,197,894
[45] Apr. 15, 1980

[54] CABLE REINFORCED PNEUMATIC TIRES

[75] Inventor: Jacques Boileau, Clermont-Ferrand, France

[73] Assignee: Compagnie Generale des Etablissements, Clermont-Ferrand, France

[21] Appl. No.: 688,470

[22] Filed: May 20, 1976

[30] Foreign Application Priority Data

May 26, 1975 [FR] France ............... 75 16371

[51] Int. Cl.² ............................................. B60C 9/02
[52] U.S. Cl. ............................. 152/361 FP; 152/359
[58] Field of Search ............ 152/361 FP, 356, 359; 57/139, 145–149, 153

[56] References Cited

U.S. PATENT DOCUMENTS

| | | | |
|---|---|---|---|
| 1,708,668 | 4/1929 | Evans | 152/359 |
| 2,116,937 | 5/1938 | Vecsey | 152/359 |
| 2,248,901 | 7/1941 | Vecsey | 152/359 |
| 2,586,795 | 2/1952 | Drisch et al. | 152/359 |
| 2,755,214 | 7/1956 | Lyons et al. | 152/359 |
| 3,243,338 | 3/1966 | Jackson | 152/359 |
| 3,253,638 | 5/1966 | Kersker et al. | 152/359 |
| 3,395,529 | 8/1968 | Ray | 152/359 |
| 3,726,078 | 4/1973 | Nakamura | 152/359 |
| 3,949,799 | 4/1976 | Montagne | 152/361 FP |

Primary Examiner—Stephen G. Kunin
Assistant Examiner—Edmond G. Rishell, Jr.
Attorney, Agent, or Firm—Brumbaugh, Graves, Donohue & Raymond

[57] ABSTRACT

Metal cables of improved fatigue strength, which are particularly suitable for use in an oblique folded ply of metal cables for tire tread reinforcement, comprise a visible outer layer of strands with each strand being formed of at least two elementary wires, the pitch of the strands being less than the pitch of the elementary wires, these two pitches being of the same direction (S or Z).

3 Claims, 8 Drawing Figures

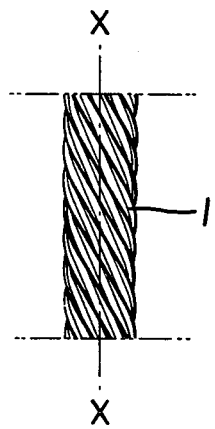
FIG. 1
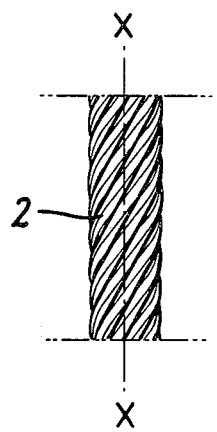
FIG. 2
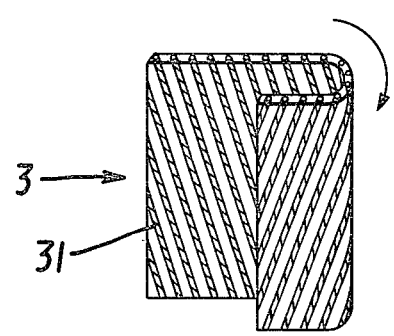
FIG. 3
FIG. 4
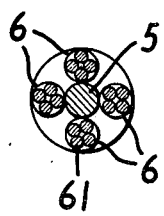
FIG. 5
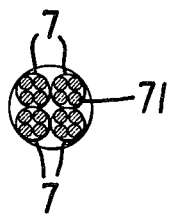
FIG. 6
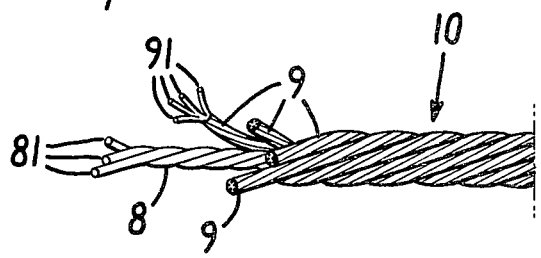
FIG. 7
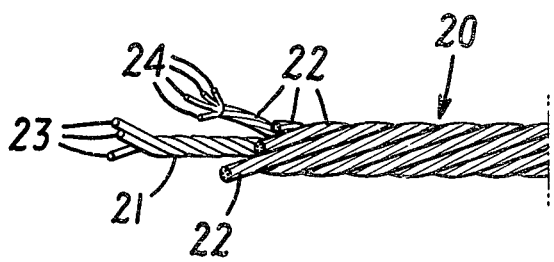
FIG. 8

CABLE REINFORCED PNEUMATIC TIRES

BACKGROUND OF THE INVENTION

The present invention relates to improvements in pneumatic tires whose reinforcement comprises at least one oblique folded ply of metal cables and to the metal cables reinforcing the said ply.

French Patent No. 1,427,886 describes a tread reinforcement intended for tires of the type referred to above, which is formed, in principle, of two oblique plies. One of said piles is reinforced with relatively rigid cables, while the other ply, which is folded around the edges of the first ply, is reinforced with relatively flexible cables, possibly metal cables. Such an arrangement facilitates the folding of the folded ply and avoids damage to the cables in the region of folding.

U.S. Pat. No. 3,949,799 relates to a special arrangement of the cables in a tread reinforcement formed of at least one folded oblique ply reinforced with metal cables. This arrangement is intended to remedy fatigue breaks of the cables in the region of the folding. It is assumed, on the one hand, that a ply of S type and a ply of Z type are plies the cables of which have an inclination in the same direction as the central portion of the letter S and of the letter Z, respectively, as seen by an observer located on the outside of the tire, and, on the other hand, that a cable of S type and a cable of Z type, respectively, are cables, the visible part of each strand (or of each wire, in the absence of strands) of which has an inclination in the same direction as the central portion of the letter S and of the letter Z, respectively, then the arrangement disclosed in U.S. Pat. No. 3,949,799 has as its purpose to untwist the cables in the folded region of the said tread ply. For this purpose, it is recommended to arrange the folded portion or portions of this ply on the outside (with respect to the tire) of the nonfolded portion when said ply appears of the same type (S or Z) as the said metal cables but, on the other hand, on the inside (with respect to the tire) of the nonfolded portion when said ply appears of a type (S or Z) different from that (Z or S) of the said metal cables. The research of the applicant has led to the discovery that the use of a cable of a special structure could provide a substantial improvement in the fatigue strength of the cables in the region of the fold of the folded plies not only when these plies are used in tread reinforcements but whatever the region of the tire in which such plies are used.

SUMMARY OF THE INVENTION

Therefore, the pneumatic tire in accordance with the invention, having a reinforcement comprising at least one folded oblique ply of metal cables, the folded portion or portions of said ply being placed on the outside (with respect to the tire) of the nonfolded portion when said ply appears of the same type (S or Z) as the said metal cables or on the inside (with respect to the tire) of the nonfolded portion when said ply appears of a type (S or Z) different from the type (Z or S) of the said metal cables, the visible outer layer of said cables being formed of strands and each strand being formed of at least two elementary wires, is characterized by the fact that the cables of the said folded ply have their visible outer layer formed of strands the pitch of which strands is less than the pitch of the elementary wires constituting the strands, these two pitches being of the same direction (S or Z).

BRIEF DESCRIPTION OF THE DRAWINGS

The accompanying drawing is intended to facilitate an understanding of the invention and illustrates a number of nonlimitative embodiments of the invention.

FIG. 1 shows a cable with strands 1 assembled in S twist, while FIG. 2 shows a cable with strands 2 assembled with Z twist, around the axis XX of the cable.

FIGS. 3 and 4 each show a ply 3 of the S type, in one case (FIG. 3) with cables 31 of S twist folded in the direction towards the observer and in the other case (FIG. 4) with cables 32 in Z twist, folded away from the observer, in accordance with the invention.

FIGS. 5 and 6 show, in section, in one case (FIG. 5) a cable having a single-wire core 5 surrounded by four strands 6 of four elementary wires 61, while in the other case (FIG. 6) the cable without a core is formed of four strands 7 of four elementary wires 71.

FIGS. 7 and 8 show cables shaped in accordance with two variants of multi-wire core cables described above, a part of the different layers having been removed successively.

In FIG. 7 there is shown a portion of a cable 10 in accordance with the first variant. The core 8, the four strands 9, and the cable 10 are of identical S type. The core 8 is formed of three wires 81; the four strands 9 are each formed of four elementary wires 91.

FIG. 8 shows a portion of a cable 20 in accordance with the second variant. The core 21, of Z type, has three wires 23, while the four strands 22 each having four elementary wires 24, and the cable 20 are of S type.

DETAILED DESCRIPTION

The invention is based on the following findings. First of all, the elementary wires break by fatigue at the periphery of the cables in the region or regions of folding. Second of all, the amount of the local untwisting in the region or regions of folding obtained by means of the arrangements described above is related to the value of the pitch of the wires, for a given obliqueness of the folded ply. However, in accordance with a preferred variant of the invention, it is advisable to limit the pitch of the strands to values greater than 1/10 of the pitch of the elementary wires in order to avoid having assemblies of wires which lack the fundamental properties of cables.

The invention, of course, extends not only to reinforcement plies, such as characterized above, but also to metal cables of the type characterized above, intended to be used to reinforce pneumatic tires.

The cables may be of the so-called elastic type, that is to say having spaced strands.

Such cables may also be without a core and be formed of a single layer of strands, but they may also, in addition, have a core formed of at least one elementary wire.

In the case of a multi-wire core, the cable may have the following variants in structure. In a first variant, the core, the strands, and the cables are all of the same type (S or Z). In a second variant, the strands and the cable are of the same type (S or Z), but the core is of a different type (Z or S). Cables corresponding to the first variant are preferably employed in the plies in accordance with the invention.

In certain cases, however, particularly when the angle of the ply is large as compared with the direction of the fold line, cables corresponding to the second variant can be used.

In accordance with the invention, on the one hand, the outer strands of the cables move away from each other and possibly from the core and, on the other hand, the wires move away from each other in each strand, when the cables are folded. This favors the penetration of the calendering rubber of the ply of cables in between the different components of the cables and their isolation from each other.

The pitch of the strands 6, 7, 9 and 22 shown in FIGS. 5-8 is less than the pitch of the elementary wires 61, 71, 91 and 24, respectively, these two pitches being of the same direction (S or Z). Preferably, the pitch of the strands 6, 7, 9 and 22 is greater than 1/10 of the pitch of the elementary wires 61, 71, 91 and 24, respectively.

What is claimed is:

1. In a pneumatic tire having a reinforcement comprising at least one folded oblique ply of metal cables, the folded portion or portions of said ply being placed on the outside (with respect to the tire) of the nonfolded portion, said ply appearing of the same type (S or Z) as the said metal cables, the visible outer layer of the said cables being formed of strands and each strand being formed of at least two elementary wires, the improvement which comprises the metal cables of the said folded oblique ply have their visible outer layer formed of strands, the pitch of which strands is less than the pitch of the elementary wires constituting the strands, these two pitches being of the same direction (S or Z); the cables of the folded ply have a multi-wire core around which a layer of strands is arranged and the cables, the strands and the cores are all of the same type (S or Z).

2. In a pneumatic tire having a reinforcement comprising at least one folded oblique ply of metal cables, the folded portion or portions of said ply being placed on the inside (with respect to the tire) of the nonfolded portion, said ply appearing of a type (S or Z) different from the type (Z or S) of the said metal cables, the visible outer layer of the said cables being formed of strands and each strand being formed of at least two elementary wires, the improvement which comprises the metal cables of the said folded oblique ply have their visible outer layer formed of strands, the pitch of which strands is less than the pitch of the elementary wires constituting the strands, these two pitches being of the same direction (S or Z); the cables of the folded ply have a multi-wire core around which a layer of strands is arranged and the cables, the strands and the cores are all of the same type (S or Z).

3. In a metal cable for tire reinforcement, the visible outer layer of which cable is formed of strands and each strand is formed of at least two elementary wires, the improvement which comprises the strands of the said outer layer have a pitch which is less than the pitch of the elementary wires constituting said strands, these two pitches being of the same direction (S or Z); the cable has a multi-wire core around which a layer of strands is arranged and the cable, the strands and the core are all of the same type (S or Z).

* * * * *

UNITED STATES PATENT AND TRADEMARK OFFICE
CERTIFICATE OF CORRECTION

PATENT NO. : 4,197,894
DATED : Apr. 15, 1980
INVENTOR(S) : Jacques Boileau

It is certified that error appears in the above—identified patent and that said Letters Patent are hereby corrected as shown below:

First page, Item 73, after "Etablissements" insert --Michelin--.

Col. 1, line 23, "It" should read --If it--.

Signed and Sealed this

Fifth Day of August 1980

[SEAL]

Attest:

SIDNEY A. DIAMOND

Attesting Officer     Commissioner of Patents and Trademarks